(12) United States Patent
Shishido et al.

(10) Patent No.: US 6,772,427 B2
(45) Date of Patent: Aug. 3, 2004

(54) MOTOR SECURING STRUCTURES AND DISC DRIVE

(75) Inventors: Yuji Shishido, Kanagawa (JP); Takashi Mochida, Chiba (JP); Mitsuhiro Ueno, Tokyo (JP); Kazutaka Nakajima, Chiba (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/182,050

(22) PCT Filed: Nov. 30, 2001

(86) PCT No.: PCT/JP01/10503

§ 371 (c)(1),
(2), (4) Date: Oct. 24, 2002

(87) PCT Pub. No.: WO02/45244

PCT Pub. Date: Jun. 6, 2002

(65) Prior Publication Data

US 2003/0112734 A1 Jun. 19, 2003

(30) Foreign Application Priority Data

Dec. 1, 2000 (JP) ........................ 2000-367671

(51) Int. Cl.[7] .............................................. G11B 23/00
(52) U.S. Cl. ...................................................... 720/663
(58) Field of Search ................................ 369/263, 249, 369/75.2, 219; 360/267.7, 267.8

(56) References Cited

U.S. PATENT DOCUMENTS

| | | | | |
|---|---|---|---|---|
| 5,831,962 A | * | 11/1998 | Sakai et al. | 369/219 |
| 6,285,649 B1 | * | 9/2001 | Bessho et al. | 369/219 |
| 6,388,980 B2 | * | 5/2002 | Otani et al. | 369/219 |
| 6,452,887 B2 | * | 9/2002 | Nakayama et al. | 369/75.2 |

FOREIGN PATENT DOCUMENTS

| | | | |
|---|---|---|---|
| JP | 1-279459 | | 11/1989 |
| JP | 01279459 A | * | 11/1989 |
| JP | 2-149173 | | 12/1990 |
| JP | 09306115 A | * | 11/1997 |
| JP | 11-39661 | | 2/1999 |
| JP | 11120568 A | * | 4/1999 |
| JP | 11175981 A | * | 7/1999 |
| JP | 11-288519 | | 10/1999 |
| JP | 2000105932 A | * | 4/2000 |
| JP | 2000-285472 | | 10/2000 |
| JP | 2000-311429 | | 11/2000 |
| JP | 2001-283446 | | 10/2001 |
| WO | WO 99/16069 | | 4/1999 |

OTHER PUBLICATIONS

International Search Report.

* cited by examiner

Primary Examiner—Tianjie Chen
(74) Attorney, Agent, or Firm—Rader, Fishman & Grauer PLLC; Ronald P. Kananen

(57) ABSTRACT

A structure for securing a spindle motor (15) supported on a motor substrate (32) to a chassis (13). The motor substrate (32) and the chassis (13) are coupled by at least three coupling sections (33). At least two of the coupling sections (33) are fixed support members (33a) which hold and space the motor substrate (32) and the chassis (13) from each other at a prescribed distance. The remaining coupling section is an adjusting support member (33b) that holds the motor substrate (32) and the chassis (13) from each other at a variable distance. Rigid holding means is incorporated in the adjusting support member (33b) and holds the motor substrate (32) and the chassis (13) so that the motor substrate (32) and the chassis (13) remain rigid.

7 Claims, 13 Drawing Sheets

MOTOR SECURING STRUCTURES AND DISC DRIVE

TECHNICAL FIELD

The present invention relates to a structure for securing an electric motor to a chassis and a disc drive apparatus using the structure. More particularly, the invention relates to a structure that makes it easy to adjust the angle at which a motor is secured to a chassis and reliably holds the motor at the angle adjusted, and also a disc drive apparatus that comprises the structure.

BACKGROUND ART

Disc drive apparatuses writes and reads data on and from recording media shaped like a disc. More precisely, the optical pickup emitting and receiving a laser beam incorporated in the disc drive apparatus writes data on a disc-shaped recording medium and reads data therefrom. To write and read data on and from the disc-shaped recording medium correctly, the optical pickup needs to have its optical axis crossing the signal-recording surface of the disc-shaped recording medium, exactly at right angles.

To adjust the angle between the optical axis of the optical pickup and the signal-recording surface of the disc-shaped recording medium, two types of adjustment should be performed. First, the angle at which optical axis inclines to the diameter (radial direction) of the disc-shaped recording medium must be adjusted. Second, the angle at which optical axis inclines to the tangential direction of the recording tracks provided on the disc-shaped recording medium must be adjusted.

Two methods of adjusting the angle of the optical axis of the pickup are available. The first method is to adjust the position of the optical pickup. The second method is to adjust the position of the disc-shaped recording medium.

The first method will be described. The optical pickup is movably supported on two guide shafts. The guide shafts are supported on the chassis such that the distance between the ends of the guide shafts can be freely changed. The distances are changed to adjust the optical pickup takes with respect to the chassis. Let us assume that the distance between the chassis and those ends of the guide shafts, which lie on the same side, at an inner recording track of the disc-shaped recording medium, is changed. In this case, the position of the optical axis is adjusted in the radial direction of the recording tracks. On the other hand, if the distance between the ends of only one guide shaft is changed, the position of the optical axis is adjusted in the tangential direction of the recording tracks. In either case, we can adjust the skew that the optical axis of the pickup has with respect to the signal-recording surface of the disc-shaped recording medium.

The second method is used in the case where a spindle motor is secured to a motor substrate fastened to the chassis with adjustment screws (usually, three screws) and a turntable is mounted on the shaft of the spindle motor to hold the disc-shaped recording medium. Coil springs are mounted on the adjustment screws and interposed between the chassis and the motor substrate. Turning the adjustment screws can change the position the spindle motor assumes to the chassis. Namely, turning the adjustment screws can adjust the angle at which the spindle motor is secured to the chassis. The position of the optical axis can thereby adjusted in the radial and tangential directions of the recording tracks. This adjusts the skew that the optical axis of the pickup has with respect to the signal-recording surface of the disc-shaped recording medium.

In the first method, the guide shafts are moved to adjust the position of the optical axis in the tangential and radial directions of the recording tracks. Hence, the optical axis will incline to both the radial direction and the tangential direction when one adjustment screw is turned. Once one adjustment screw is turned, the other adjustment screws must be turned. Obviously it would be difficult to adjust the skew of the optical axis.

Further, the skew adjustment must be carried out in different ways when the optical pickup is at an inner recording track of the disc-shaped recording medium and when it is at an outer recording track of the recording medium. This renders the skew adjustment intricate and cumbersome.

Since the guide shafts extend a long distance along the diameter of the disc-shaped recording medium, the adjustment screws must be turned many times to incline the guide shafts at a prescribed desired angle, thereby to adjust the position of the optical head in the tangential and radial direction of the recording tracks. The distance (displacement) the adjustment screws must be moved in the vertical direction is inevitably long as compared to the change of skew angle. This makes it difficult to decrease the thickness of the disc drive apparatus.

In the second method, elastic members such as coil springs are indispensable to the structure of securing the motor substrate to the chassis, for the purpose of adjusting the angle at which the spindle motor is secured to the chassis. Moreover, the spindle motor is a source of vibration. Due to the use of elastic members and the vibration generated by the spindle motor, the motor substrate cannot be stable in position with respect to the chassis.

DISCLOSURE OF THE INVENTION

An object of this invention is to provide a motor-securing structure that can adjust the angle at which an electric motor is secured to a chassis and can secure the motor to the chassis steadfast such that the motor generates no vibration even if its position is adjusted.

Another object of the invention is to provide a disc drive apparatus in which the skew angle the optical pickup has with respect to the disc-shaped recording medium can be easily and quickly adjusted in both the tangential direction and radial direction of the recording tracks provided on the recording medium, and in which the distance or displacement the adjustment screws must be moved is short enough to decrease the thickness of the apparatus.

To achieve these objects, a motor-securing structure according to the invention is designed to secure an electric motor supported on a motor substrate to a chassis. The structure comprises: at least three coupling sections which couple the motor substrate and the chassis to each other, at least two of said coupling sections being fixed support members which hold and space the motor substrate and the chassis from each other at a prescribed distance, and the remaining coupling section being an adjusting support member which holds the motor substrate and the chassis from each other at a variable distance; and rigid holding means incorporated in the adjusting support member, for holding the motor substrate and the chassis so that the motor substrate and the chassis remain rigid.

When the adjusting support member is operated, adjusting the distance between the motor substrate and the chassis, the angle at which the motor is inclined to the chassis is changed. Once the angle is thus changed, the motor substrate and the chassis are held and remain rigid. This suppresses a vibration problem that may generally results from the spindle motor that is a source of vibration.

A disc drive apparatus according to this invention comprises: a turntable for holding a disc-shaped recording medium; a spindle motor for rotating the turntable; an optical pickup for reading and writing data on and from the disc-shaped recording medium; guide shafts supporting the optical pickup, allowing the optical pickup to move in a radial direction of the disc-shaped recording medium; a thread motor for moving the optical pickup; a tangential-skew adjusting mechanism for adjusting a skew of an optical axis of the optical pickup, mainly with respect to a tangential direction (of the recording tracks of the disc-shaped recording medium); and a radial-skew adjusting mechanism for adjusting a skew of the optical axis of the optical pickup, mainly with respect to a radial direction (of the recording tracks of the disc-shaped recording medium).

In the disc drive apparatus of the invention, the skew of the optical axis of the pickup with respect to the disc-shaped recording medium can be adjusted in the tangential direction of the recording tracks, and almost independently in the radial direction thereof. Hence, the inclination of the optical axis can be adjusted easily and quickly.

The other objects and other advantages of the invention will be more apparent from the following description of the embodiments.

BEST MODE FOR CARRYING OUT THE INVENTION

Embodiments of the present invention will be described, with reference to the accompanying drawings.

An embodiment described below is a CD-ROM (Compact Disc Read Only Memory) drive to be incorporated in notebook-type personal computers and a structure for securing the spindle motor of the CD-ROM drive to the chassis thereof.

Figure 1:
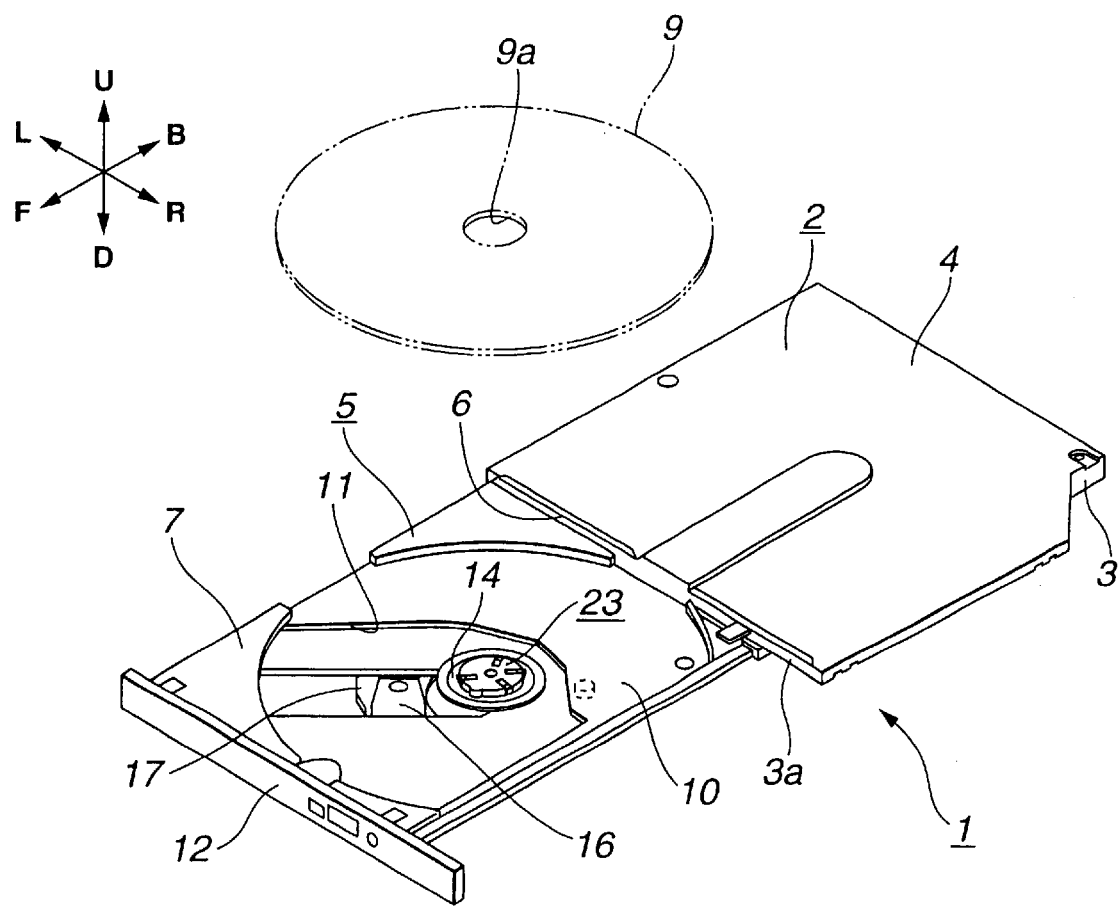
FIG. 1 is a perspective view of a CD-ROM drive according to the present invention, designed for use in notebook-type personal computers, showing the disc tray drawn out of the housing.
Figure 2:
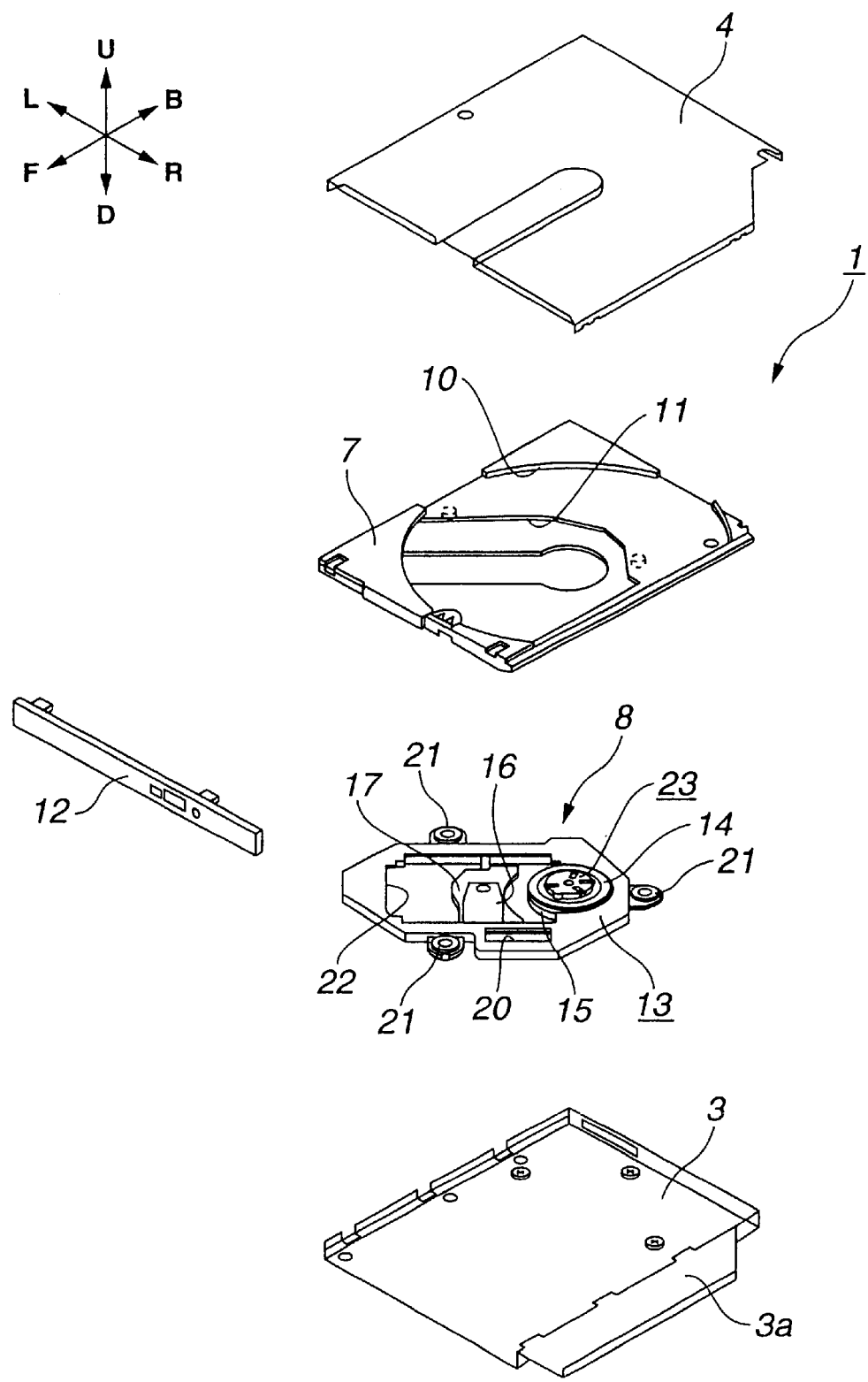
FIG. 2 is an exploded view of the CD-ROM drive.
Figure 3:
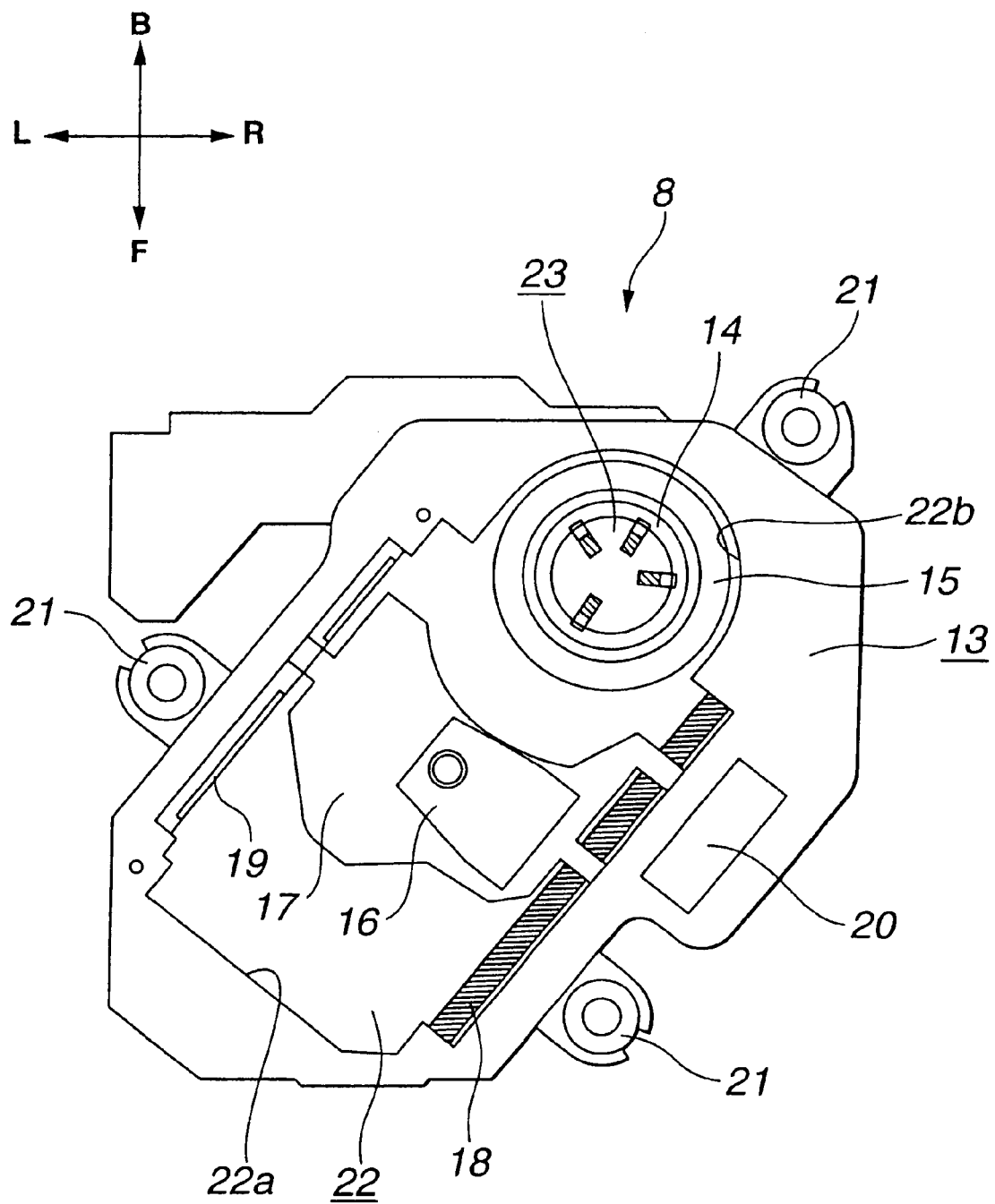
FIG. 3 is a plan view of the base unit of the CD-ROM drive.

The CD-ROM drive according to this invention will be first described, with reference to FIGS. 1 to 3.

As FIG. 1 shows, the CD-ROM drive 1 comprises a flat housing 2 that opens at the front. The housing 2 comprises a bottom chassis 3 and a cover 4. The chassis 3 defines the lower surface of the housing 2. The cover 4 is fastened to the upper surface of the bottom chassis 2. The housing 2 holds a drawer 5, which can drawn from the housing 2 as is illustrated in FIG. 1.

The arrows shown in FIGS. 1 to 3 indicate directions U, D, L, R, F and B. These directions U, D, L, R, F and B mean upward, downward, leftward, rightward, forward and backward, respectively.

As FIG. 2 depicts, the bottom chassis 3 has a projecting part 3a. This part 3a protrudes from the right edge (FIG. 2) and lies at a lever higher than the other part. The other part of the bottom chassis 3 and the cover 4 define a space 6 as long as the cover 4 covers the bottom chassis 3. The space 6 accommodates a tray 7.

The drawer 5 includes a base unit 8, which is supported on the tray 7 that is made of a synthetic resin. A slide mechanism (not shown) is interposed between a side of the drawer 5 and a side of the housing 2. The slide mechanism facilitates the drawing and insertion of the drawer 5 from and into the housing 2.

As FIG. 1 shows, the tray 7 is flat and rectangular, extending in the back-to-fore direction. It is slightly less wide than the space 6 provided in the housing 2.

The tray 7 has a circular recess 10 in the upper surface. The recess 10 is provided to hold a CD-ROM 9 that is a disc-shaped recording medium. As FIG. 1 shows, the bottom of the recess 10 has an opening 11. The opening 11 exposes the base unit 8 at the top.

A front panel 12 is fastened to the front of the tray 7. The front panel 12 is an elongated plate made of synthetic resin. The panel 12 extends in the left-to-right direction and has almost the same length as the width of the housing 2 (see FIG. 1).

The base unit 8, which is mounted on the bottom chassis 3, supports various components as will be described below.

Supported on the base unit 8 are a turntable 14, a spindle motor 15, an optical pickup 16, a carriage 17, guide shafts 18 and 19, a thread motor 20, and the like (see FIG. 3). The turntable 14 supports the CD-ROM 9. The spindle motor 15 rotates the turntable 14. The optical pickup 16 reads data from the CD-ROM 9. The carriage 17 holds the optical pickup 16 and can be moved in the radial direction of the CD-ROM 9. The guide shafts 18 and 19 support the carriage 17. The thread motor 20 moves the optical pickup 16.

The guide shaft 18 is the main guide shaft. It is a feed screw, set in engagement with one end of the carriage 17. The thread motor 20 rotates the main guide shaft 18 as a group of gears transmit to it the driving force of the thread motor 20. The carriage 17 is thereby moved in the axial direction of the guide shaft 18 (see FIG. 3).

The guide shaft 19 is the auxiliary guide shaft. The other end of the carriage 17 is mounted on the guide shaft 19, with a minimum clearance, and can slide on the guide shaft 19. Thus, the guide shaft 19 prevents the carriage 17 from rotating around the main guide shaft 18 when the main guide shaft 18 is rotated.

The chassis 13 is a shaped plate. It is fastened to the lower surface of the tray 7 by rubber dampers 21 as is shown in FIG. 3.

The chassis 13 has a large opening 22, which occupies almost all area of the chassis 13. The opening 22 is almost rectangular, which extends from the front edge of the chassis 13 to the rear edge thereof (see FIG. 3). The opening 22 consists of two openings 22a and 22b. The opening 22a defines the front rim of the opening 22. The rear rim of the opening 22a is slightly inclined to the other rims. The optical pickup is fitted in the opening 22a. The opening 22b is semicircular and continuous to the rear rim of the opening 22a. One half of the turntable is placed in the opening 22b.

The CD-ROM drive 1 according to the invention further comprises a tangential-skew adjusting mechanism 23 and a radial-skew adjusting mechanism 24. These mechanisms 23 and 24 can adjust the position of the optical axis of the pickup, respectively, in the tangential direction and radial direction of the recording tracks.

Figure 7:
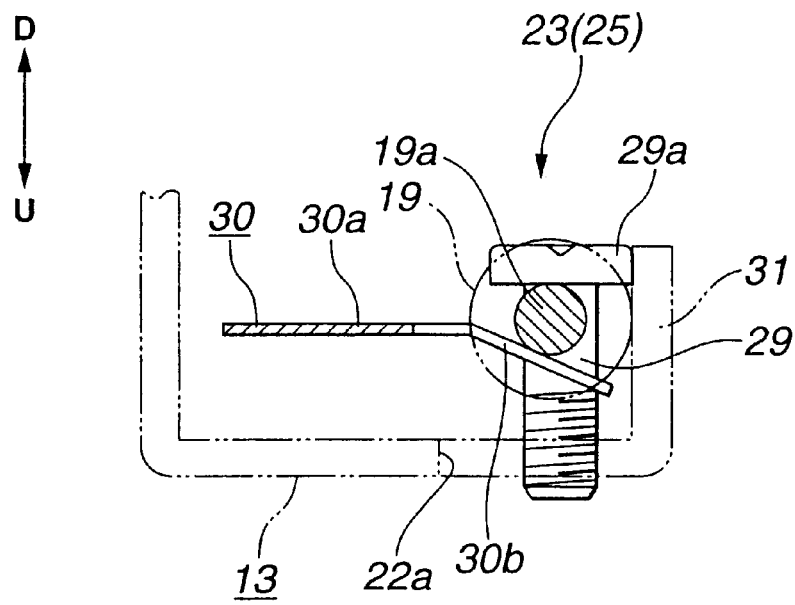
FIG. 7 is a magnified, cross-sectional view taken along line VII—VII in FIG. 6.

The tangential-skew adjusting mechanism 23 comprises gap-adjusting means 25 (see FIG. 7). One gap-adjusting means 25 adjusts the gap between the auxiliary guide shaft 19 and the chassis 13. The other gap-adjusting means 25 adjusts the gap between the ends of the auxiliary guide shaft 19.

Before describing the tangential-skew adjusting mechanism 23, it will be described how to secure the main guide shaft 18 to the chassis 13.

The main guide shaft 18 is arranged, extending along the right rim of the opening 22a, in which the optical pickup is placed. The shaft 18 has both ends rotatably held by bearings 26 that are fastened to the chassis 13. The main guide shaft 18 is thereby attached to the chassis 13. Therefore, it is impossible to change the gap between the main guide shaft 18 and the chassis 13 (see FIG. 6).

The main guide shaft 18 holds a gear 27 at one end. The gear 27 is in mesh with an intermediate gear 28. The intermediate gear 28 is, in turn, set in mesh with the output gear 20a mounted on the shaft of the thread motor 20 (see FIG. 6).

The gap-adjusting means 25 are provided at the ends of the auxiliary guide shaft 19, respectively. The auxiliary guide shaft 19 has small-diameter end portions 19a. One end portion 19a is pinched, along with a leaf spring 30, between the chassis 13 and the head 29a of an adjustment screw 29. Similarly, the other end portion 19a is pinched, along with the leaf spring 30, between the chassis 13 and the head 29b of another adjustment screw 29. When each screw 29 is turned in one direction, pressing the end portion 19a of the auxiliary guide shaft 19, against the force of the leaf spring 30, the end portion 19a approaches the chassis 13. Conversely, when the screw 29 is turned in the other direction, the leaf spring 30 pushes the end portion 19a of the auxiliary guide shaft 19 away from the chassis 13. Hence, the inclination of the auxiliary guide shaft 19 with respect to the chassis 13 can be adjusted by turning the adjustment screws 29, each in a desired direction and to a desired extent (see FIG. 6).

Figure 4:
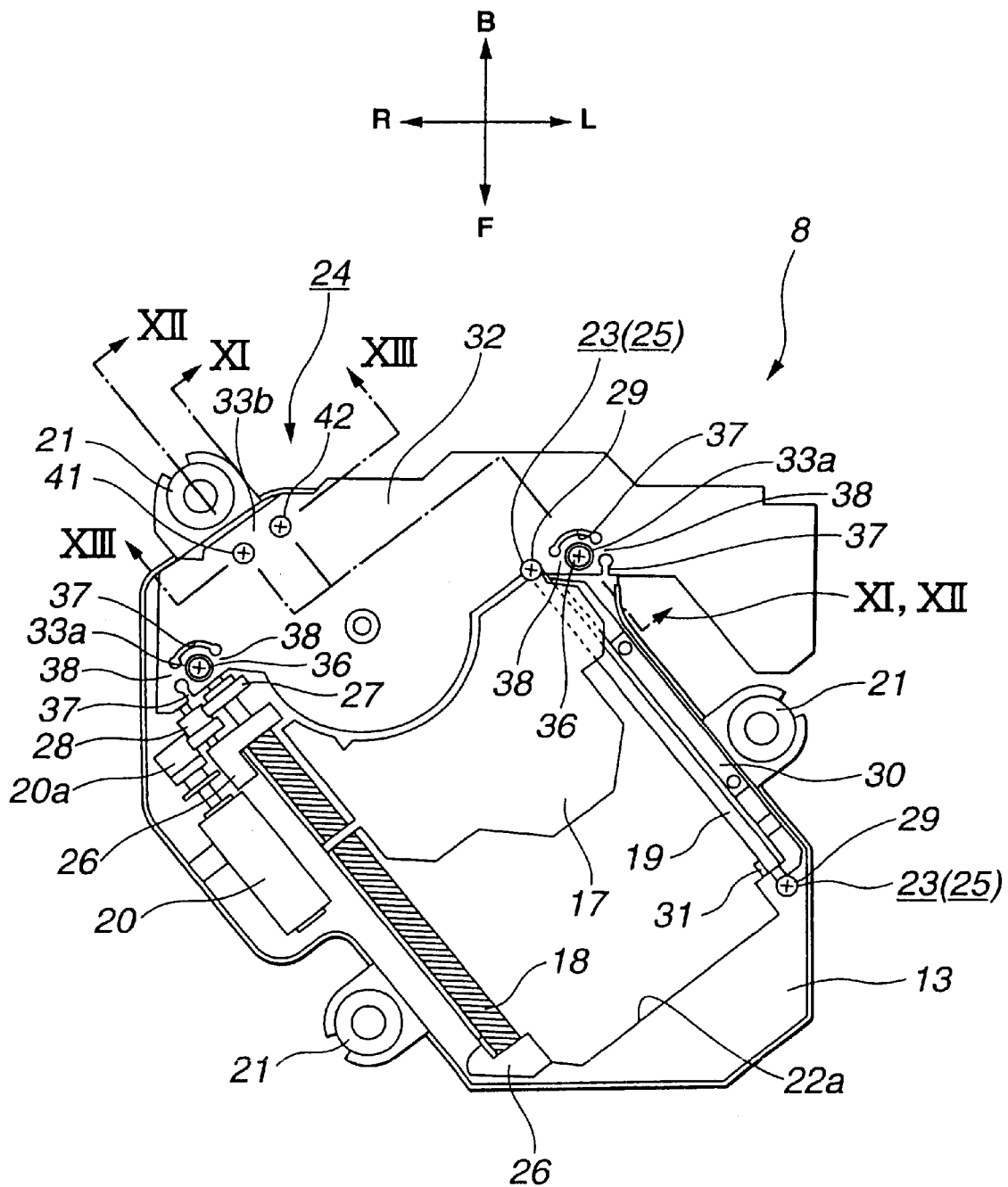
FIG. 4 is a bottom view of the base unit.

More specifically, the leaf spring 30 is shaped like a letter C, comprising a middle portion 30a and two end portions 30b. The middle portion 30a is a little longer than the auxiliary guide shaft 19. The end portions 30b are formed integral with the middle portion 30a and extend sideways from the ends of the middle portion 30a. The middle portion 30a is fixed to the lower surface of the chassis 13 and extends along the left rim of the opening 22a (see FIG. 4). The ends of the middle portion 30a are bent, rising from the chassis 13. The end portions 30b of the leaf spring 30 have their distal ends bent, each approaching the chassis 13 (see FIG. 7).

Figure 6:
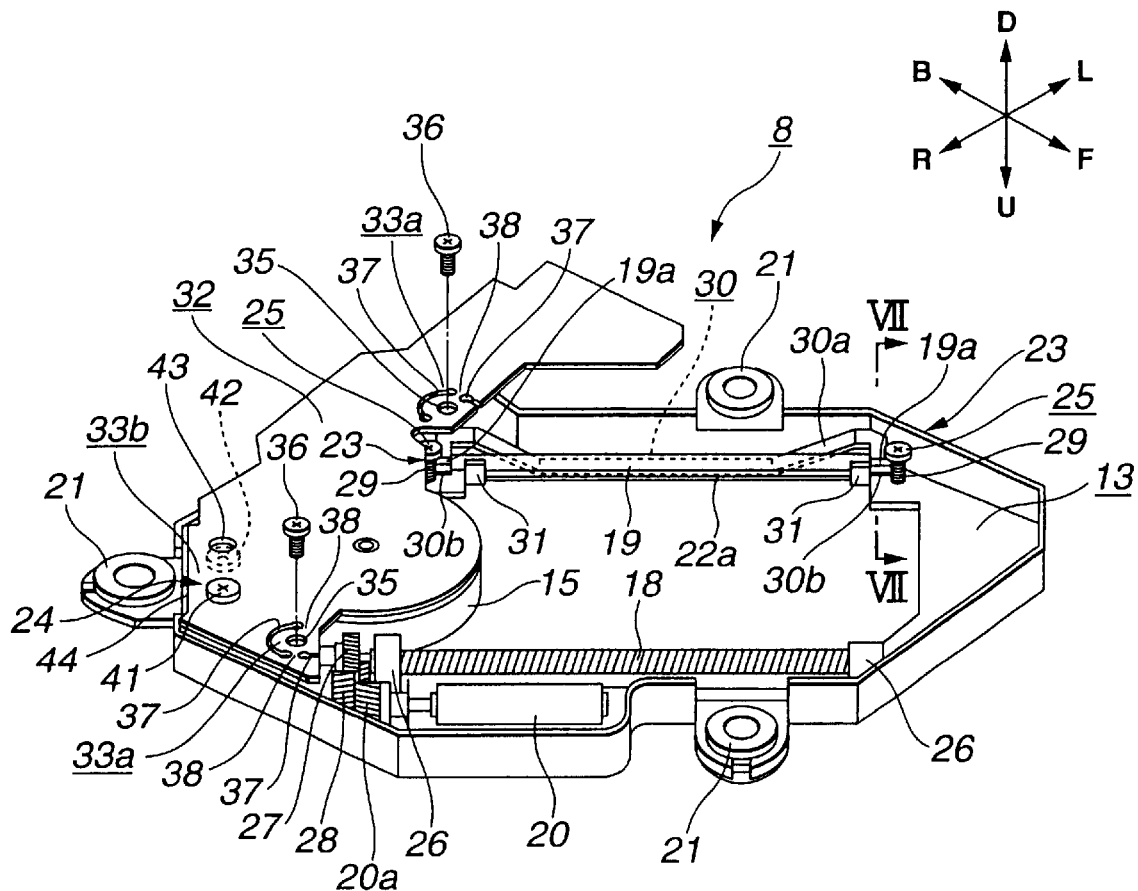
FIG. 6 is a perspective view of the base unit as observed from below.

Holding strips 31 are formed integral with the chassis 13 and located at the ends of the right rim of the opening 22a (see FIG. 6). Each holing strip 31 is bend, extending downwards.

The small-diameter end portions 19a of the auxiliary guide shaft 19 lie beneath the end portions 30b of the leaf spring 30 and contact the end portions 30b, respectively. The heads 29a of the adjustment screws 29 push the end portions 19a from below. The end portions 19a are thereby pressed onto the end portions 30b of the leaf spring 30. The auxiliary guide shaft 19 is biased to move into the housing 2 via the opening 22a in which the optical pickup is placed (see FIG. 7).

The auxiliary guide shaft 19 is fastened to the chassis 13. The holding strips 31 that are formed integral with the chassis 13 prevent the auxiliary guide shaft 19 from moving into the opening 22a (see FIG. 7).

Figure 8:
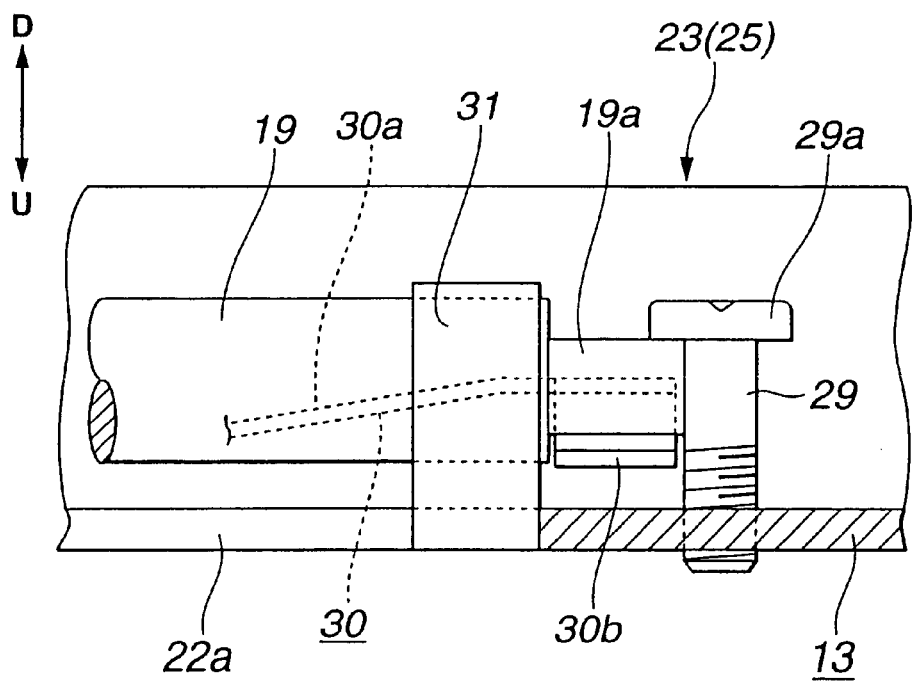
FIG. 8 is a magnified side view of the tangential skew adjustment mechanism incorporated in the CD-ROM drive.
Figure 9:
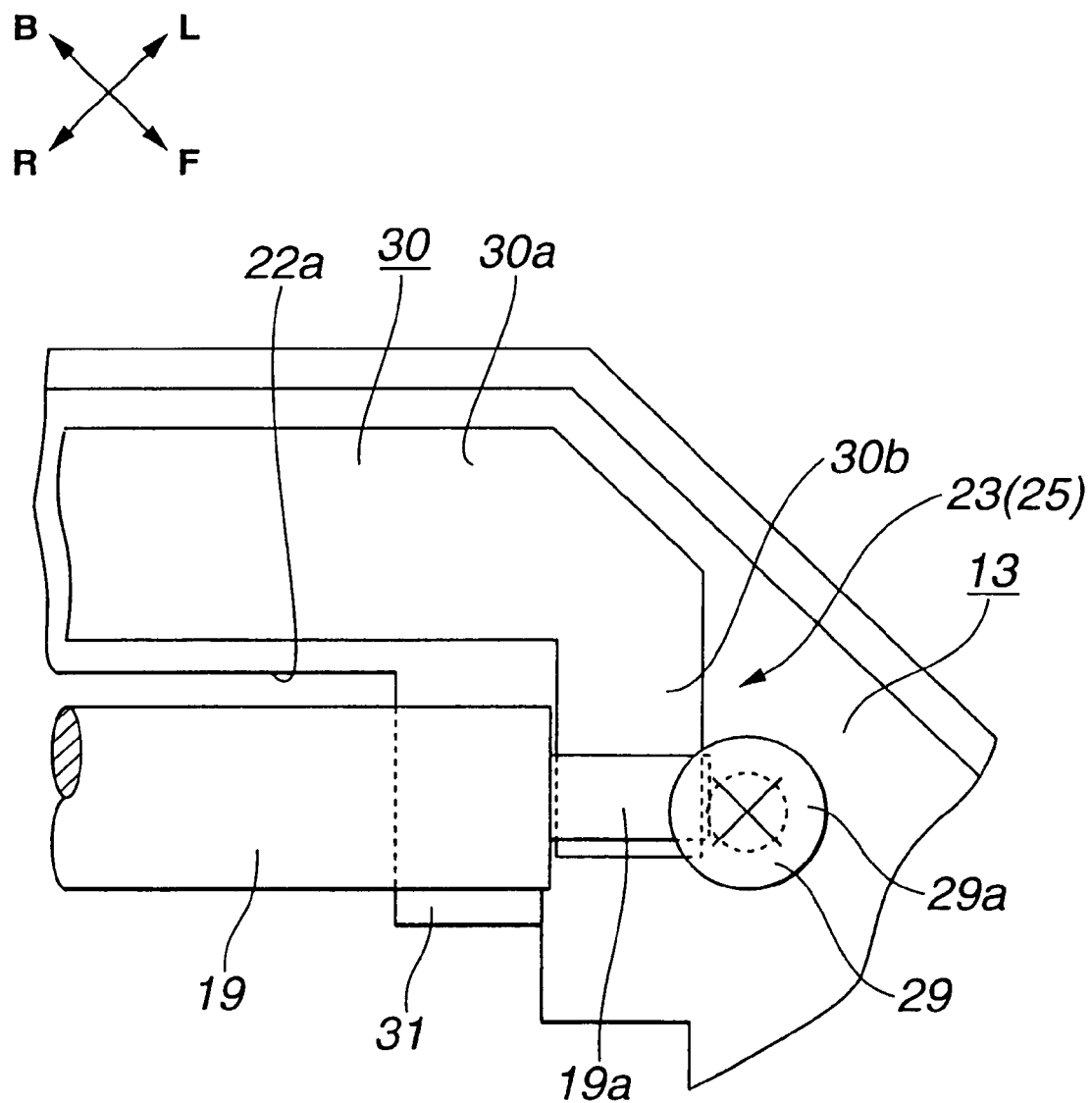
FIG. 9 is a magnified plan view of the tangential skew adjustment mechanism.

The gap between the auxiliary guide shaft 19 and the chassis 13 decreases when the adjustment screws 29 are driven into the chassis, and increases when the adjustment screws 29 are loosened (see FIGS. 7 and 8).

One or both of the gap-adjusting means 25 are operated, adjusting the gap between the chassis 13 and one or both of the end portions 19a of the auxiliary guide shaft 19. The tangential-skew adjusting mechanism 23 can therefore adjust the inclination of the optical axis of the pickup 16 with respect to the tangential direction of the recording tracks (see FIG. 6).

When adjustment is made, moving the small-diameter end portions 19a of the auxiliary guide shaft 19 toward the chassis 13, the optical pickup 16 rotates around the main guide shaft 18, approaching the auxiliary guide shaft 19. The inclination of the optical axis of the pickup, with respect to the tangential direction of the CD-ROM 9 is adjusted. Namely, the inclination of the optical pickup is adjusted with respect to the tangential direction of the recording tracks of the CD-ROM 9.

The main guide shaft 18 is fixed in position and is therefore spaced at a specific distance from the chassis 13. Nevertheless, the main guide shaft 18 may be moved to change the distance between it and the chassis 13, in the present invention.

The radial-skew adjusting mechanism 24 will be described (see FIG. 10).

Figure 10:
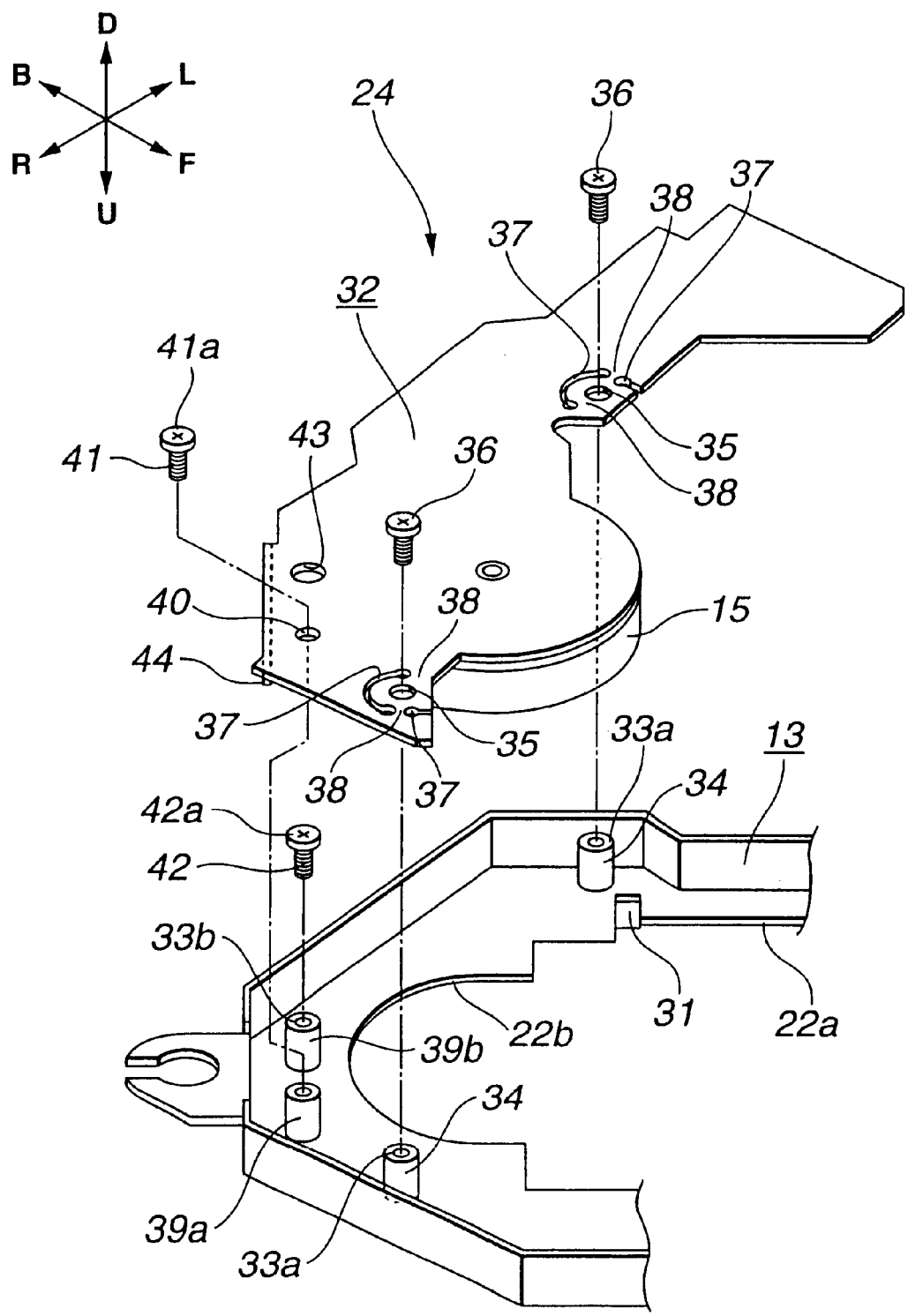
FIG. 10 is an exploded view of the radial skew adjustment mechanism provided in the CD-ROM drive.
Figure 11:
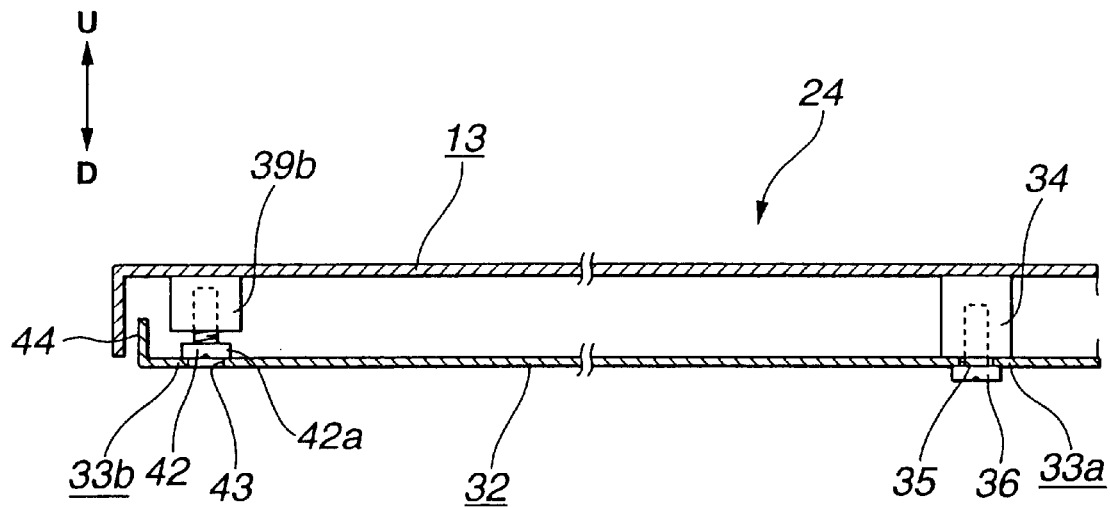
FIG. 11 is a magnified, cross-sectional view taken along line XI—XI in FIG. 4.
Figure 12:
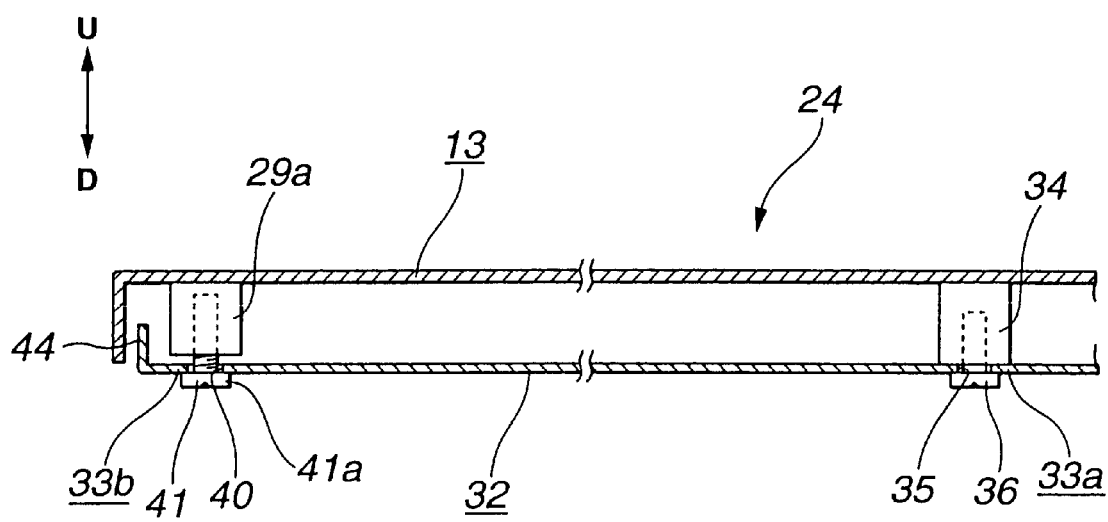
FIG. 12 is a magnified, cross-sectional view taken along line XII—XII in FIG. 4.

The radial-skew adjusting mechanism 24 comprises a chassis 13, a motor substrate 32 and three coupling sections 33 (see FIG. 10). The motor substrate 32 supports the chassis 13 and spindle motor 15. The coupling sections 33 couple the motor substrate 32 to the chassis 13.

The motor substrate 32 is a relatively rigid metal plate such as a stainless steel plate. A printed wiring board is bonded to the upper surface of the motor substrate 32. The wiring board is almost identical in shape to the motor substrate 32.

Figure 5:
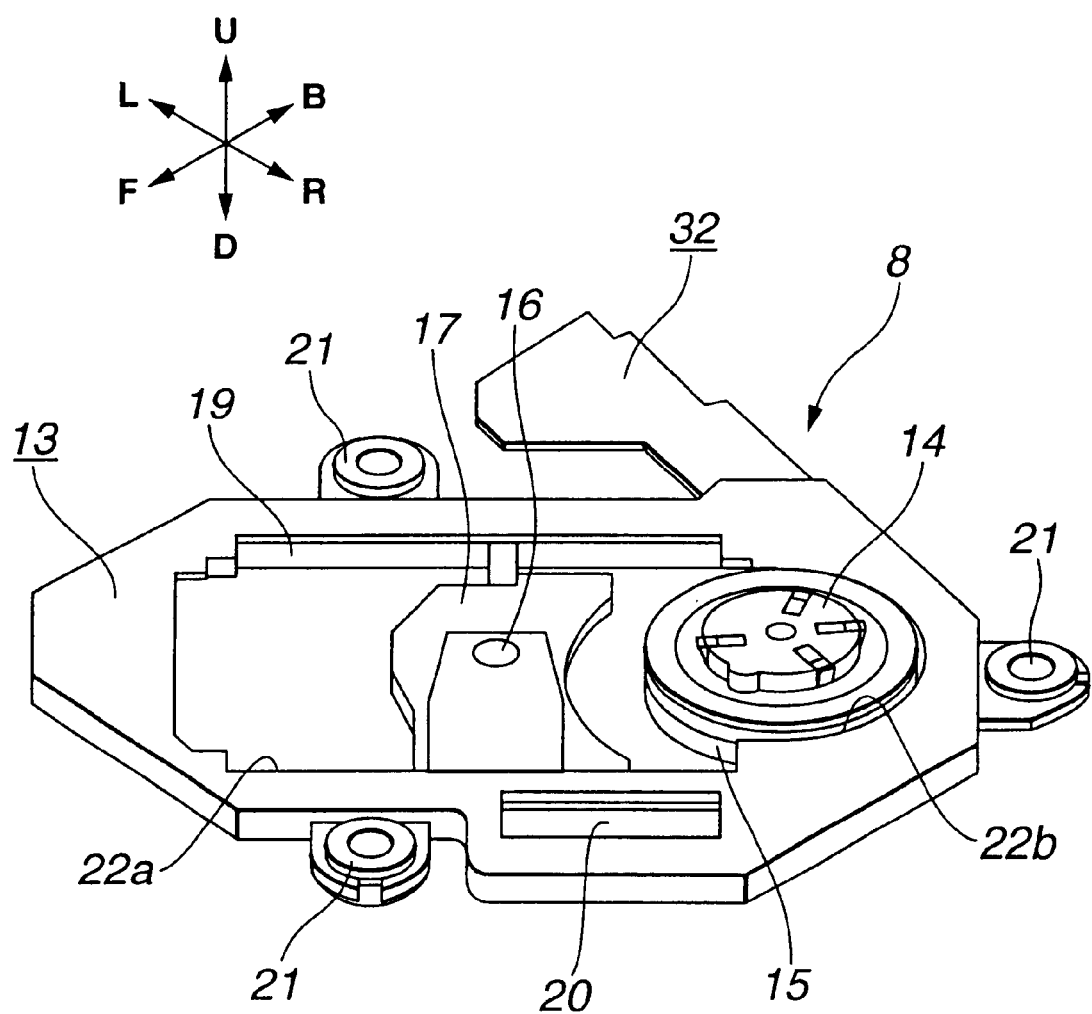
FIG. 5 is a perspective view of the base unit.

The spindle motor 15 comprises a stator and a rotor. The stator is provided on the printed wiring board. The rotor can rotate, whereas the stator is fixed in place. The turntable 14 for holding the CD-ROM 9 lies above the spindle motor 15. The turntable 14 is a component integral or not integral with the rotor. As indicated above, the turntable 14 lies in the opening 22a made in the chassis 13 and protrudes from the upper surface of the chassis 13 (see FIG. 5).

Two of the three coupling sections 33 coupling the motor substrate 32 to the chassis 13 are fixed support members 33a, each spaced from the chassis 13 by a fixed distance. The other coupling section 33 is an adjusting support member 33b that can move toward and away from the chassis 13 (see FIG. 10).

The fixed support members 33a, which are components of the radial-skew adjusting mechanism 24, comprise a boss 34 and a screw 36 each. The bosses 34 are provided on the lower surface of the chassis 13. One boss 34 is located near that end of the main guide shaft 18, on which the gear 27 is mounted. The other boss 34 is located near that end of the auxiliary guide shaft 19 which corresponds to the said end of the main guide shaft 18. The screws 36 pass the screw holes 35 cut in the motor substrate 32 and driven into the bosses 34 (see FIG. 4).

The adjusting support member 33b can be moved to adjust the distance between the motor substrate 32 and the chassis 13, by rotating the motor substrate 32 around the line connecting the fixed support members 33a and thus inclining the motor substrate 32 to the chassis 13.

To perform radial skew adjustment of the optical axis it is desired that the line, around which the motor substrate 32 is rotated, should cross the guide shafts 18 and 19 at almost right angles. In the present embodiment, however, the bosses 34 do not extend at right angles to the guide shafts 18 and 19. Rather, the bosses 34 are inclined a little (see FIG. 4). This is because the direction of moving the optical pickup 16 and the position of the spindle motor 15 have been determined so as to miniaturize the disc drive apparatus.

The motor substrate 32 has arcuate or elongate slits 37. Two slits 37 surround one screw hole 35 for the fixed support member 33a. The substrate 32 therefore has narrow parts 38, each lying between two slits 37 (see FIG. 10).

The stress and strain generated at the screw holes 35 when the motor substrate 32 is inclined to the chassis 13 as will be described later concentrate at the narrow parts 38. This prevents any other part of the motor substrate 32 from being deformed (see FIG. 14).

Alternatively, those parts of the motor substrate 32 which surround the screw holes 35 may be made thin than any other parts. The stress and strain generated at the screw holes 35 when the motor substrate 32 is inclined to the chassis 13 concentrate at such thin parts of the substrate 32. In this case, too, the motor substrate 32 is prevented from being deformed in its entirety (see FIG. 14).

In the present embodiment, the slits 37 extend only half around each screw hole 35. This is because the screw hole 35 is made at a position near the edge of the motor substrate 32. It suffices if the motor substrate 32 has fragile parts (see FIG. 10).

The adjusting support member 33b of the radial-skew adjusting mechanism 24 comprises two bosses 39 and two adjustment screws 41 and 42. The bosses 39 are provided on the lower surface of the chassis 13, located behind the spindle motor 15 and spaced apart along a line crossing at right angles to the guide shafts 18 and 19. The adjustment screw 41 passes a screw hole 40 made in the motor substrate 32 and driven into the boss 39a, whereas the adjustment screw 42 is driven directly into the other boss 39b (see FIG. 13).

First, the second adjustment screw 42 is driven into the boss 39b. Then, the first adjustment screw 41 is passed through the screw hole 40 of the motor substrate 32 and set into the boss 39a. As the first adjustment screw 41 is driven into the boss 39a, the motor substrate 32 abuts on the head 42a of the second adjustment screw 42. The motor substrate 32 is therefore fixed in place, clamped between the head 41a of the first adjustment screw 41 and the head 42a of the second adjustment screw 42 (see FIG. 13).

Since the first and second adjustment screws 41 and 42 are provided relatively close to each other, the motor substrate 32 held between the screws 41 and 42 is secured to the chassis 13 and remains rigid. Thus, the adjusting support member 33b serves as a rigid holding means.

The gap between the chassis 13 and that part of the motor substrate 32 which is held by the adjusting support member 33b is adjusted by driving or loosening the two adjustment screws 41 and 42.

More specifically, the substrate 32 has an adjustment hole 43 in the part that opposes the head 42a of the second adjustment screw 42. The adjustment hole 43 is smaller than the head 42a of the screw 42. When the second adjustment screw 42 is driven, a gap develops between its head 42a and the motor substrate 32. When the first adjustment screw 41 is driven next, the gap is eliminated. The motor substrate 32 is thereby pushed onto the head 42a of the second adjustment screw 42. The gap between the chassis 13 and the motor substrate 32 can therefore be decreased and adjusted.

When the first adjustment screw 41 is loosened, there develops a gap between the motor substrate 32 and the head 42a of the second adjustment screw 42. When the second adjustment screw 42 is then loosened, this gap is eliminated. The head 42a of the screw 42 is pushed onto the motor substrate 32. In this case, the gap between the chassis 13 and the motor substrate 32 can be increased.

Figure 13:
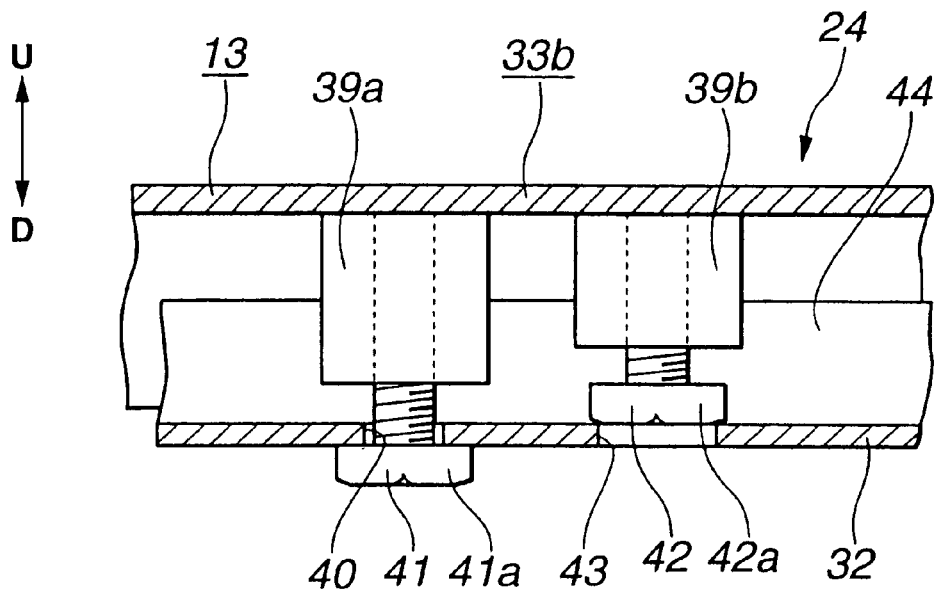
FIG. 13 is a magnified, cross-sectional view taken along line XIII—XIII in FIG. 4.

A tool such as a screw driver may be inserted into the adjustment hole 43 and may be turned to drive or loosen the second adjustment screw 42 (see FIG. 13).

In this embodiment, the first and second adjustment screws 41 and 42 are driven into the bosses 39a and 39b that stand on the chassis 13. The present invention is not limited to this structural feature. The bosses may be provided on the motor substrate 32, and the first and second adjustment screws 41 and 42 may be driven into these bosses to fasten the motor substrate 32 to the chassis 13. It suffices to adjust the gap between one plate (motor substrate) and the other plate (chassis), while clamping said one plate between the heads of the two adjustment screws.

Figure 14:
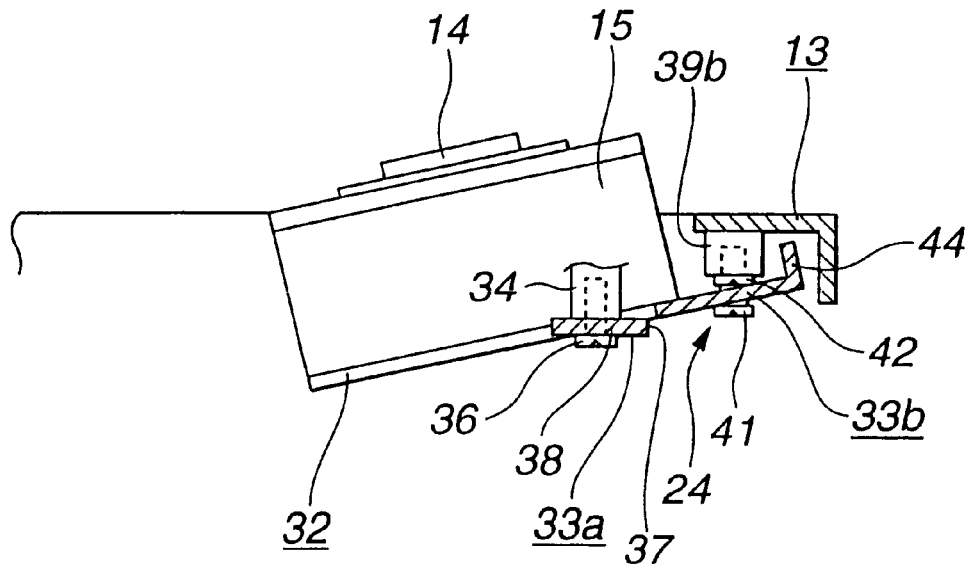
FIG. 14 is a schematic cross-sectional view of the radial skew adjustment mechanism.

The motor substrate 32 has a strip 44 at the edge near the screw hole 40 and a small adjustment hole 42 (see FIG. 14). The strip 44 is bent downward at this edge of the motor substrate 32. The strip 44 acts as a flange, preventing the edge part of the substrate 32 from being deformed when the two adjustment screws 41 and 42 are turned in either direction with a great force.

It is therefore possible to easily control the fastening torque applied to the first adjustment screw 41 and the second adjustment screw 42. The strip 44 reinforces said edge part of the motor substrate 32 when the two adjustment screws 41 and 42 are driven too much or unscrewed too much. The strip 44 may have any other shape than is shown. It may be shaped like a rib that extends in a line connecting the two adjustment screws 41 and 42 or parallel to this line.

The motor substrate 32 can be inclined to the chassis 13 by moving the adjusting support member 33b that is a component of the radial-skew adjusting mechanism 24.

When the adjusting support member 33b is moved, the motor substrate 32 and the chassis 13 might be deformed if the motor substrate 32 had no fragile parts (e.g., narrow parts 38) at the positions between the fixed support members 33a and the chassis 13 (boss 39). In particular, the chassis 13 may be deformed since the motor substrate 32 is made of rigid material. Such deformation is undesirable in high-precision mechanisms like the radial-skew adjusting mechanism 24.

The stress on the motor substrate 32 is concentrated at the fragile parts (i.e., narrow parts 38) of the motor substrate 32, which lie near the fixed support members 33a. Therefore, neither the motor substrate 32 nor the chassis 13 has a strain or is deformed. Thus, the radial-skew adjusting mechanism 24 has a structure that any high-precision mechanism should have (see FIG. 14). Not only the motor substrate 32, but also the chassis 13 may have fragile parts. In brief, it suffices if the chassis 13 and the motor substrate 32 are designed not to be entirely deformed.

The narrow parts 38 may be arranged so that they may extend at right angles to the above-mentioned radial direction. In this case, the motor substrate 32 can be easily inclined to the radial direction only when its position is adjusted by the use of the adjusting support member 33b.

FIG. 14 is a cross-sectional view, or a schematic representation of the radial skew adjustment mechanism 24. The spindle motor 15 shown in FIG. 14 is extremely inclined to the chassis 13 for the purpose of illustrating the narrow parts 38 that are deformed very much.

When the adjusting support member 33b of the radial-skew adjusting mechanism 24 is moved as described above, the motor substrate 32 is inclined to the chassis 13. The radial-skew adjusting mechanism 24 can therefore adjust the inclination of the optical axis of the pickup 16 with respect to the radial direction, i.e., the diameter of the CD-ROM 9.

In the prior art, long guide shafts are used to adjust the inclination of the optical axis of the pickup with respect to the radial direction of the recording tracks, as has been described above. In the present invention, it is sufficient to incline the motor substrate 32 to adjust the inclination of the optical axis of the pickup. Hence, it suffices to drive or unscrew the adjustment screws 41 and 42 only a little. The distance (displacement) the adjustment screws should be moved in vertical direction is short as compared to the change in the skew angle. This contributes to the reduction of the thickness of the CD-ROM drive 1.

In the CD-ROM drive 1, the skew of the optical axis of the pickup 16 with respect to the CD-ROM 9 can be adjusted by in the tangential direction of the recording tracks, and almost independently in the radial direction thereof. The inclination of the optical axis can therefore be adjusted easily and quickly.

As indicated earlier, the spindle motor 15 is inclined (to the radial direction) by moving the adjusting support member 33b of the radial-skew adjusting mechanism 24. The adjusting support member 33b functions as a means for rigidly holding the motor substrate 32 in cooperation with the chassis 13. The adjusting support member 33b can therefore steadily and reliably secure the spindle motor 15 to the chassis 13, without causing a vibration problem that may generally results from the spindle motor that is a source of vibration.

Figure 15:
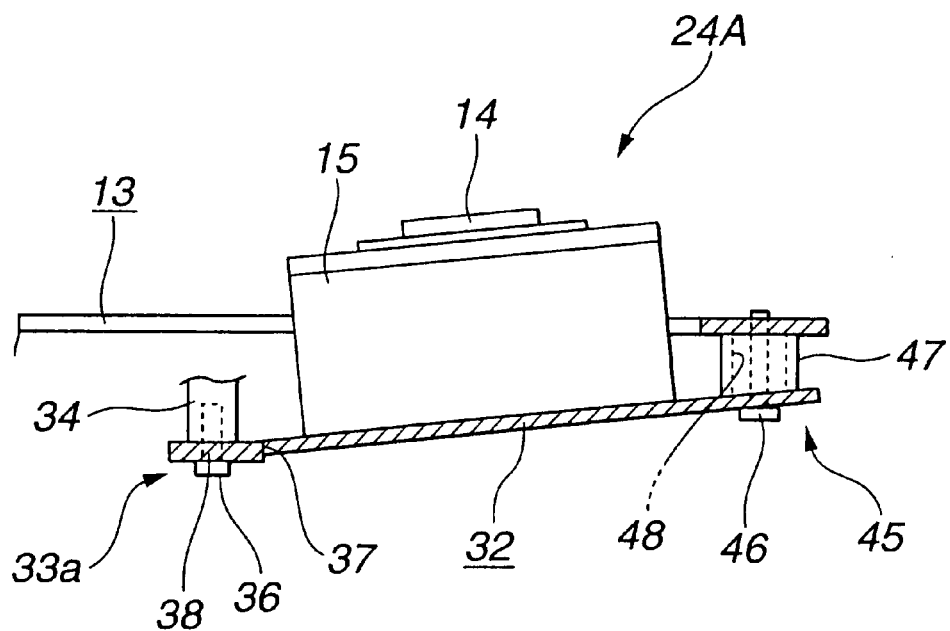
FIG. 15 is a schematic cross-sectional view of a radial skew adjustment mechanism of another type.
Figure 16:
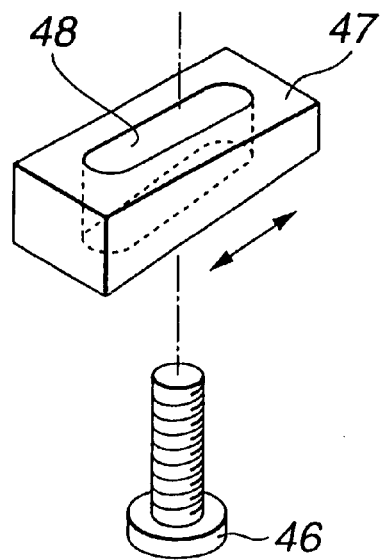
FIG. 16 is a perspective view of some components of the mechanism shown in FIG. 15.

FIGS. 15 and 16 show a radial skew adjustment mechanism 24A of another type, designed to adjust the radial skew of the spindle motor 15. This mechanism 24A differs from the radial-skew adjusting mechanism 24 in that an adjustment member 45 is used in place of the boss 39b. FIG. 15 is a schematic cross-sectional view of the radial skew adjustment mechanism 24A, showing the spindle motor 15 inclined to the chassis 13 far more than is possible in practice.

The adjustment member 45 can serve as a rigid holding means, too. The adjustment member 45 comprises an adjustment screw 46 and a wedge-shaped spacer 47. The adjustment screw 46 passes through a hole made in the motor substrate 32. The spacer 47 is interposed between the motor substrate 32 and the chassis 13.

The spacer 47 has an elongated hole 48 that extends in the lengthwise direction. The adjustment screw 46 passes though this hole 48 and is driven into the screw hole cut in the chassis 13.

To incline the motor substrate 32 with respect to the chassis 13, the adjustment screw 46 is loosened a little and the spacer 47 is moved in its lengthwise direction. The gap between the motor substrate 32 and the chassis 13 is thereby changed to a prescribed value. Thereafter, the adjustment screw 46 is driven into the screw hole of the chassis 13, thus fastening the motor substrate 32 to the chassis 13.

The motor substrate 32 and the chassis 13, thus adjusted, remain coupled rigidly because no elastic member is interposed between them.

Figure 17:
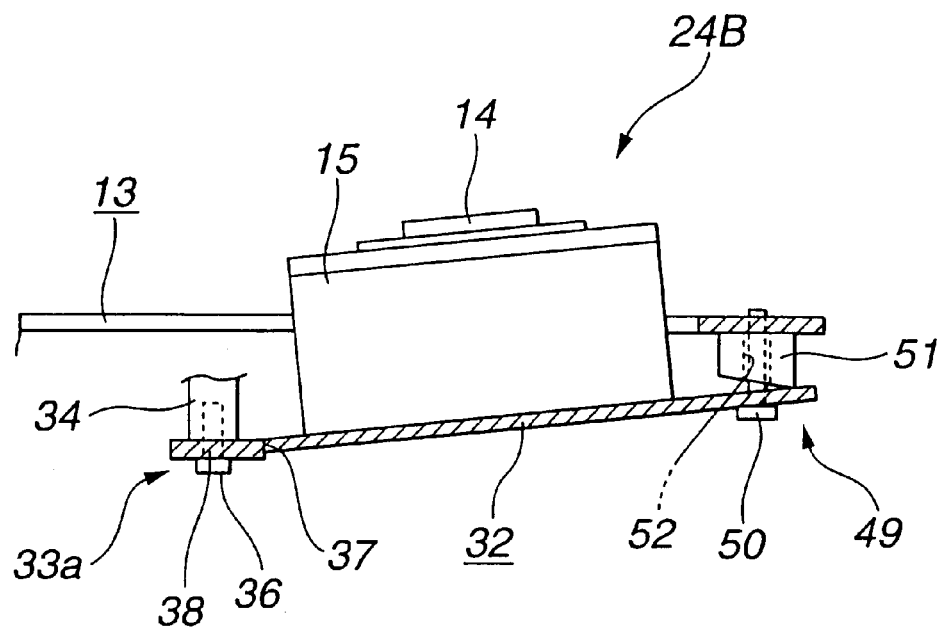
FIG. 17 is a schematic cross-sectional view of a radial skew adjustment mechanism of still another type.
Figure 18:
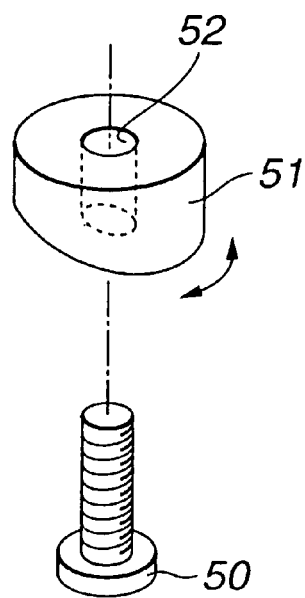
FIG. 18 is a perspective view of some components of the mechanism shown in FIG. 17.

FIGS. 17 and 18 illustrates a radial skew adjustment mechanism 24B of still another type. The radial skew adjustment mechanism 24B differs from the radial-skew adjusting mechanism 24 in that an adjustment member 49 is used in place of the boss 39b. FIG. 17 is a schematic cross-sectional view of a radial skew adjustment mechanism 24B. It shows the spindle motor 15 inclined to the chassis 13 far more than is possible in practice.

The adjustment member 49 can serve as a rigid holding means, too. The adjustment member 49 comprises an adjustment screw 50 and a hollow cylindrical spacer 51. The adjustment screw 50 passes through a hole made in the motor substrate 32. The spacer 51 is interposed between the motor substrate 32 and the chassis 13 and has an inclined surface at one end.

The spacer 51 has a through hole 52. The adjustment screw 50 passes though this hole 52 and is driven into the screw hole cut in the chassis 13.

To incline the motor substrate 32 to the chassis 13, the adjustment screw 50 is loosened a little and the spacer 51 is rotated, changing the gap between the motor substrate 32 and the chassis 13 to a prescribed value. Thereafter, the adjustment screw 50 is driven into the screw hole of the chassis 13, thus securing the motor substrate 32 to the chassis 13.

The motor substrate 32 and the chassis 13, thus adjusted, remain coupled rigidly because no elastic member is interposed between them.

An embodiment of the invention and a few modifications of the embodiment have been described. The shapes and structures of the components of the embodiment and the modifications thereof are no more than examples. Therefore, the scope of the present invention should not be interpreted from the structural features exemplified.

INDUSTRIAL APPLICABILITY

A motor-securing structure according to the invention is designed to secure an electric motor supported on a motor substrate to a chassis. The structure comprises at least three coupling sections, which couple the motor substrate and the chassis to each other. At least two of said coupling sections are fixed support members which hold and space the motor substrate and the chassis from each other at a prescribed distance. The remaining coupling section is an adjusting support member that holds the motor substrate and the chassis from each other at a variable distance. The structure further comprises rigid holding means incorporated in the adjusting support member and holding the motor substrate and the chassis so that the motor substrate and the chassis remain rigid.

In the motor-securing structure, the adjusting support member is operated, adjusting the distance between the motor substrate and the chassis, the angle at which the motor is inclined to the chassis is changed. Once the angle is thus changed, the motor substrate and the chassis are held and remain rigid. This suppresses a vibration problem that may generally results from the spindle motor that is a source of vibration.

The motor substrate has fragile parts (where a stress is concentrated) in the vicinity of the fixed support members. The stress exerted on the motor substrate and the chassis when the inclination of the substrate to the chassis is adjusted concentrates at the fragile parts. No strain will be applied to the chassis and the entire motor substrate. Neither the chassis nor the motor substrate will be deformed. The structure is suitable for use in high-precision apparatuses.

Slits are made in the motor substrate and located near the fixed support members, forming the fragile parts (at which a stress is concentrated). The fragile parts are simple in structure. The motor-securing structure therefore has a simple structure, and can yet prevent the motor substrate and the chassis from being deformed.

The adjusting support member comprises a first adjustment screw for moving the motor substrate toward the chassis when driven and a second adjustment screw having a head interposed between the motor substrate and the chassis. The motor substrate or the chassis is clamped between the heads of the first and second adjustment screws when the first and second adjustment screws are turned. The adjusting support member is very simple in structure and very easy to operate, and can yet hold the motor substrate and the chassis sufficiently rigid. The adjusting support member can therefore steadily and reliably secure the spindle motor to the chassis, without causing a vibration problem that may generally results from the spindle motor that is a source of vibration.

Further, the motor substrate or the chassis has reinforcing parts that extend in a line connecting the two adjustment screws of the adjusting support member or in parallel to the line. The part of the motor substrate or the chassis, which is clamped between the heads of the adjustment screws, is hardly deformed when both adjustment screws are forcedly turned in either direction. This makes it easy to control the fastening torque applied to the first adjustment screw and the second adjustment screw.

A disc drive apparatus according to the invention comprises: a turntable for holding a disc-shaped recording medium; a spindle motor for rotating the turntable; an optical pickup for reading and writing data on and from the disc-shaped recording medium; guide shafts supporting the optical pickup, allowing the optical pickup to move in a radial direction of the disc-shaped recording medium; a thread motor for moving the optical pickup; a tangential-skew adjusting mechanism for adjusting a skew of an optical axis of the optical pickup, mainly with respect to a tangential direction (of the recording tracks of the disc-shaped recording medium); and a radial-skew adjusting mechanism for adjusting a skew of the optical axis of the optical pickup, mainly with respect to a radial direction (of the recording tracks of the disc-shaped recording medium).

In the disc drive apparatus of the invention, the skew of the optical axis of the pickup with respect to the disc-shaped recording medium can be adjusted in the tangential direction of the recording tracks, and almost independently in the radial direction thereof. Hence, the inclination of the optical axis can be adjusted easily and quickly.

The tangential-skew adjusting mechanism inclines the guide shafts to the chassis, and the radial-skew adjusting mechanism inclines the spindle motor to the chassis. Namely, the guide shafts, i.e., long members, are not inclined to the chassis at all. The skew angle can therefore be greatly biased by turning the adjustment screws only a little in either direction. In other words, the vertical movement (displacement) of the screws is small as compared to the change in the skew angle. This small adjustment in the vertical direction is small contributes to the reduction in thickness of the apparatus.

The radial-skew adjusting mechanism comprises rigid holding means that holds the motor substrate supporting the spindle motor, so that the motor substrate and the chassis remain rigid. The rigid holding means secures the motor substrate to the chassis. The radial-skew adjusting mechanism can adjust the radial skew, though it is simple in structure. In addition, it can reliably maintain the motor substrate at the skew angle thus adjusted. Hence, it can steadily and reliably secure the spindle motor to the chassis, without causing a vibration problem that may generally results from the spindle motor that is a source of vibration.

Moreover, at least three coupling sections couple the motor substrate and the chassis to each other. The radial-skew adjusting mechanism comprises fixed support members that are at least two of said coupling sections, and an adjusting support member that is the remaining coupling section. The fixed support members hold and space the motor substrate and the chassis from each other at a prescribed distance. The adjusting support member holds the motor substrate and the chassis from each other at a variable distance. The adjusting support member incorporates rigid holding means that holds the motor substrate and the chassis so that the motor substrate and the chassis remain rigid. Thus, if the adjusting support member is moved, adjusting the distance between the motor substrate and the chassis, the angle at which the spindle motor is inclined to the chassis can be changed. This makes it possible to secure the spindle motor to the chassis without causing a vibration problem that may generally results from the spindle motor that is a source of vibration.

The motor substrate has fragile parts (where a stress is concentrated) near the fixed support members The stress exerted on the motor substrate and the chassis when the inclination of the substrate to the chassis is adjusted concentrates at the fragile parts. No strain will be applied to the chassis and the entire motor substrate. Neither the chassis nor the motor substrate will be deformed. This structure is suitable for use in high-precision apparatuses.

Slits are made in the motor substrate and located near the fixed support members, forming the fragile parts (at which a stress is concentrated). The fragile parts are simple in structure. The motor-securing structure therefore has a simple structure, and can yet prevent the motor substrate and the chassis from being deformed.

Moreover, the adjusting support member comprises a first adjustment screw for moving the motor substrate toward the chassis when driven and a second adjustment screw having a head interposed between the motor substrate and the chassis. The motor substrate or the chassis is clamped between the heads of the first and second adjustment screws when the first and second adjustment screws are turned. The adjusting support member is very simple in structure and very easy to operate, and can yet hold the motor substrate and the chassis sufficiently rigid. The adjusting support member can therefore steadily and reliably secure the spindle motor to the chassis, without causing a vibration problem that may generally results from the spindle motor that is a source of vibration.

Furthermore, the motor substrate or the chassis has reinforcing parts that extend in a line connecting the two adjustment screws of the adjusting support member or in parallel to the line. The part of the motor substrate or the chassis, which is clamped between the heads of the adjustment screws, is hardly deformed when both adjustment screws are forcedly turned in either direction. This makes it easy to control the fastening torque applied to the first adjustment screw and the second adjustment screw.

What is claimed is:

1. A disc drive apparatus comprising:
   a turntable for holding a disc-shaped recording medium;
   a spindle motor for rotating the turntable;
   an optical pickup for reading and writing data on and from the disc-shaped recording medium;
   guide shafts supporting the optical pickup, allowing the optical pickup to move in a radial direction of the disc-shaped recording medium;
   a thread motor for moving the optical pickup;
   a tangential-skew adjusting mechanism for adjusting a skew of an optical axis of the optical pickup, mainly with respect to a tangential direction of the recording tracks of the disc-shaped recording medium; and
   a radial-skew adjusting mechanism for adjusting a skew of the optical axis of the optical pickup, mainly with respect to a radial direction of the recording tracks of the disc-shaped recording medium, wherein:
      the tangential-skew adjusting mechanism inclines the guide shafts to the chassis, thereby to adjust the skew of the optical axis, and the radial-skew adjusting mechanism inclines the spindle motor to the chassis, thereby to adjust the skew of the optical axis;
      the radial-skew adjusting mechanism which inclines the spindle motor to the chassis comprises rigid holding means holding the chassis and a motor substrate supporting the spindle motor so that the motor substrate and the chassis remain rigid, and the rigid holding means secures the motor substrate to the chassis;
      the motor substrate and the chassis are coupled to each other by at least three coupling sections;
      the radial-skew adjusting mechanism comprises fixed support members and an adjusting support member, the fixed support members are at least two of said coupling sections which hold and space the motor substrate and the chassis from each other at a prescribed distance, the adjusting support member is the remaining coupling section which holds the motor substrate and the chassis from each other at a variable distance;
      the adjusting support member has rigid holding means holding the chassis and a motor substrate supporting the spindle motor so that the motor substrate and the chassis remain rigid; and
      the adjusting support member comprises a first adjustment screw for moving the motor substrate toward the chassis when driven and a second adjustment screw having a head interposed between the motor substrate and the chassis, the motor substrate or the chassis is clamped between the heads of the first and second adjustment screws when the first and second adjustment screws are turned.

2. The disc drive apparatus according to claim 1, wherein the fixed support members are arranged in a direction that is substantially perpendicular to an inclination in the radial direction of the disc-shaped recording medium.

3. The disc drive apparatus according to claim 1, wherein the motor substrate has fragile parts in the vicinity of the fixed support members.

4. The disc drive apparatus according to claim 3, wherein the fragile parts are slits made in the motor substrate and located near the fixed support members.

5. The disc drive apparatus according to claim 1, wherein the first and second adjustment screws are arranged close to each other in a direction perpendicular to the guide shafts.

6. The disc drive apparatus according to claim 1, wherein the motor substrate has a reinforcing part which extends in a line connecting the two adjustment screws of the adjusting support member or in parallel to the line.

7. A disc drive apparatus comprising:
   a turntable for holding a disc-shaped recording medium;
   a spindle motor for rotating the turntable;
   an optical pickup for reading and writing data on and from the disc-shaped recording medium;
   guide shafts supporting the optical pickup, allowing the optical pickup to move in a radial direction of the disc-shaped recording medium;
   a thread motor for moving the optical pickup; and
   a radial-skew adjusting mechanism for inclining the guide shafts to the chassis, thereby to adjust a skew of an optical axis of the optical pickup, mainly with respect to a radial direction of the recording tracks of the disc-shaped recording medium,
   wherein the radial-skew adjusting mechanism comprises at least three coupling sections which couple a motor substrate and the chassis to each other;
   at least two of said coupling sections are fixed support members which hold and space the motor substrate and the chassis from each other at a prescribed distance, the remaining coupling section is an adjusting support member which holds the motor substrate and the chassis from each other at a variable distance;
   the motor substrate has slits near the fixed support members, thus having fragile parts;
   the adjusting support member comprises a first adjustment screw for moving the motor substrate toward the chassis when driven and a second adjustment screw having a head interposed between the motor substrate and the chassis, the motor substrate or the chassis is clamped between the heads of the first and second adjustment screws when the first and second adjustment screws are turned; and
   the motor substrate has a reinforcing part which extends in a line connecting the two adjustment screws of the adjusting support member or in parallel to the line.

* * * * *